(12) United States Patent
Hajash et al.

(10) Patent No.: US 9,289,782 B2
(45) Date of Patent: Mar. 22, 2016

(54) SYSTEM AND METHOD FOR AIR FILTRATION VIA CYCLONE SEPARATORS ENCLOSED WITHIN EXTERIOR WALLS

(71) Applicant: Cal Poly Corporation, San Luis Obispo, CA (US)

(72) Inventors: Kathleen Sofia Hajash, Brooklyn, NY (US); Kyleen Hoover, Chicago, IL (US); Kateri Vita Knapp, Garden City, NY (US); Natacha Schnider, San Luis Obispo, CA (US); Carmen Gayle Trudell, San Luis Obispo, CA (US)

(73) Assignee: Cal Poly Corporation, San Luis Obispo, CA (US)

( * ) Notice: Subject to any disclaimer, the term of this patent is extended or adjusted under 35 U.S.C. 154(b) by 182 days.

(21) Appl. No.: 13/998,597

(22) Filed: Nov. 15, 2013

(65) Prior Publication Data

US 2015/0135656 A1    May 21, 2015

(51) Int. Cl.
| | |
|---|---|
| B01D 45/12 | (2006.01) |
| B04C 5/04 | (2006.01) |
| B01D 45/08 | (2006.01) |
| B01D 45/16 | (2006.01) |
| B01D 50/00 | (2006.01) |
| B01D 45/06 | (2006.01) |
| B04C 5/12 | (2006.01) |
| B04C 5/14 | (2006.01) |
| B04C 9/00 | (2006.01) |

(52) U.S. Cl.
CPC . *B04C 5/04* (2013.01); *B01D 45/06* (2013.01); *B01D 45/08* (2013.01); *B01D 45/12* (2013.01); *B01D 45/16* (2013.01); *B01D 50/002* (2013.01); *B04C 5/12* (2013.01); *B04C 5/14* (2013.01); *B04C 9/00* (2013.01)

(58) Field of Classification Search
CPC ...... B01D 45/08; B01D 45/16; B01D 50/002; B01D 45/12; B01D 45/06; B04C 5/04
USPC .................. 55/345-349, 447, 459.1, 462, 428
See application file for complete search history.

(56) References Cited

U.S. PATENT DOCUMENTS

| | | | | |
|---|---|---|---|---|
| 3,146,998 | A * | 9/1964 | Golucke et al. | 432/16 |
| 8,679,235 | B1 * | 3/2014 | Wiederin et al. | 95/271 |

OTHER PUBLICATIONS

Carmen Gayle Trudell, Combined Active, Passive, and Biological Methods for Cleaning Indoor Air and Reducing Building Energy Consumption, Masters Thesis, Rensselaer Polytechnic Institute Troy New York, Jul. 2012, pp. 56-58.

* cited by examiner

*Primary Examiner* — Dung H Bui
(74) *Attorney, Agent, or Firm* — D'Arcy H. Lorimer; Lorimer Labs

(57) ABSTRACT

A system for air purification using cyclone separators mounted with wall structures is disclosed. Air entering a building is filtered by passage through a coupled array of cyclone separators mounted within concrete blocks. Each cyclone separator is composed of two components, a cyclone chamber and a coupler. The coupler contains the air inlet, air outlet, as well as baffles to induce cyclonic flow within the chambers. The cyclone chambers can be fashioned as cavities within solid concrete blocks or added as separate components to the couplers. Both the couplers and chambers can be employed within hollow construction blocks, and the couplers can be further incorporated within gaskets that fit between rows of construction blocks.

17 Claims, 16 Drawing Sheets

SYSTEM AND METHOD FOR AIR FILTRATION VIA CYCLONE SEPARATORS ENCLOSED WITHIN EXTERIOR WALLS

BACKGROUND OF THE INVENTION

The invention relates to the design and structure of air filtration systems for buildings and architectural structures. More specifically, the invention relates to a system of interconnected cyclone separators built into exterior wall structures of buildings.

Filtration of breathing air has become important for the comfort, health, and safety of people living inside modern buildings and domestic structures. Commercial structures such as office buildings often have HVAC (heating, ventilation, and air conditioning) systems that pull in air from outside the building, and filter it to remove harmful particulates before adding this air to the re-circulated air inside the building. These systems are expensive and use a considerable amount of energy. Most single family homes and many apartment buildings have no such air filtration system, as outside air is introduced mainly through open windows. This method of "fresh" air infusion has only a minimum of particle filtration, consisting typically of insect screens. These screens do little to block the introduction of particulates into the home. As a result the homeowner may be exposed to allergy causing dust, pollen, soot, and other harmful particulates. This contamination results in the homeowner spending many hours trying to remove (dusting, vacuuming) these particulates from inside the home. Once introduced, the smaller particulates are extremely hard to remove due to their strong attraction to surfaces. Homeowners often employ expensive filtration units placed within the home to reduce airborne particle counts, particularly if a household member has allergies, asthma, or other respiratory ailments.

While the use of modern HVAC systems could be employed in single family homes and small apartment buildings, their capital cost is prohibitive to all but the most expensive high end homes and apartments. What is needed is a more cost effective air filtration system for single family dwellings.

Cyclone separators have been employed by modern industry for many years to separate solid particulates from gasses. Typically, they require moderately high gas velocities (or pressure drops) provided by compressors or fans. Rarely, if ever, are they employed in the filtration of air for domestic dwellings, particularly single family homes. Air filtration for domestic dwellings is typically carried out by pleated "flow through" filter systems.

Trudell, in a Masters degree thesis document submitted to the graduate faculty of Rensselaer Polytechnic Institute, published August 2012, suggests the incorporation of single cyclone separators fashioned within solid masonry wall construction blocks. These would utilize the pressure drop created by wind pressure outside the building to force contaminated air into the cyclone separator's inlet. The reverse flow cyclonic separation would create a particulate stream leaving the bottom of the cyclone and clean air leaving the exhaust at the top, which is directed into the interior of the building.

There are a number of difficulties with the approach suggested by Trudell. The entire cyclone structure must be fabricated within the body of each solid block, which requires rather precise masonry molding techniques due to the specific geometries required by the cyclone separators. This requirement increases the cost of the construction blocks, which may be prohibitive for low cost housing or for use in third world countries. Furthermore, the use of solid molded blocks limits the use of reinforcing steel (or re-bar), commonly used within masonry walls.

These and other limitations of the prior art will become apparent to those of skill in the art upon a reading of the following descriptions and a study of the several figures of the drawing.

SUMMARY OF THE INVENTION

It is an object of the present invention to provide a system for air filtration including: a first cyclone separator chamber having a cylindrically shaped portion disposed above a conically shaped portion; a second cyclone separator chamber having a cylindrically shaped portion disposed above a conically shaped portion, a port fashioned within a wall of the cylindrically shaped portion; and a cyclone separator coupler disposed between the conically shaped portion of the first cyclone separator chamber and the cylindrically shaped portion of the second cyclone separator chamber, wherein the cyclone separator coupler has an input on a top surface for particulates leaving the bottom of the first cyclone separator chamber, an unfiltered air inlet directing air through the port of said second cyclone separator chamber, and a baffle to introduce rotary air motion within the second cyclone separator chamber.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTION OF THE PREFERRED EMBODIMENTS

While the incorporation of cyclone separators within external walls of a dwelling has clear advantages over conventional HVAC air filtration techniques, the heretofore proposed implementation structures leave much to be desired. Casting of the complex cyclone structures within a fully enclosed masonry block proves to be difficult and expensive. Furthermore, since the individual intake and exhaust ports of each cyclone separator are isolated, control of how much air is introduced into the home is difficult without the addition of other baffle or wall structures. Embodiments of the present invention serve to significantly improve upon the basic concept, lowering costs while improving flexibility. Embodiments of the present invention allow for the incorporation of interconnected cyclone separators within a network of conventional "cinder" masonry blocks. Such a network allows for various air flow scenarios, including the feeding and exhausting of all cyclone separator units within passages fashioned within the walls themselves. If desired, a central air feed and central filtered air exhaust can be provided, allowing for flow control, insect control, and centralized feed to a conventional heating/air conditioning system.

Central to the embodiments of the present invention is a modified structure of the cyclone separator comprising a coupler and a cyclone chamber. The coupler is provided with the dirty air inlet, the clean air outlet, and the required internal baffling to induce the required directional airflows in the cyclone chamber to which the coupler is attached. The coupler further provides for connection to another cyclone chamber mounted above it, having a built in flow passage for disposing of the particle stream exiting the above mounted cyclone chamber.

Figure 1A:
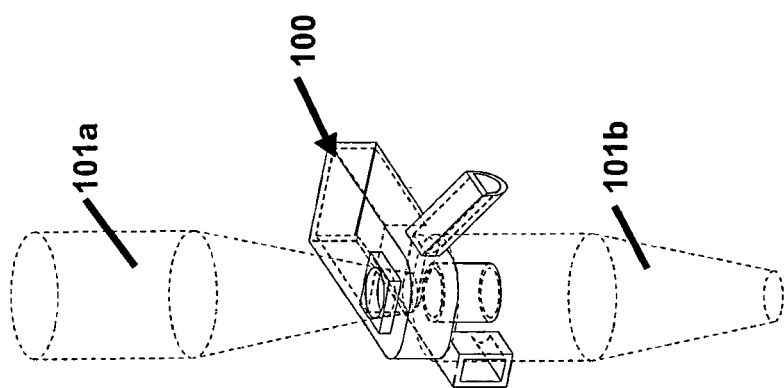
FIG. 1a is a perspective view of cyclone separator coupler mounted between two cyclone chambers in accordance with an example embodiment of the present invention.
Figure 1B:
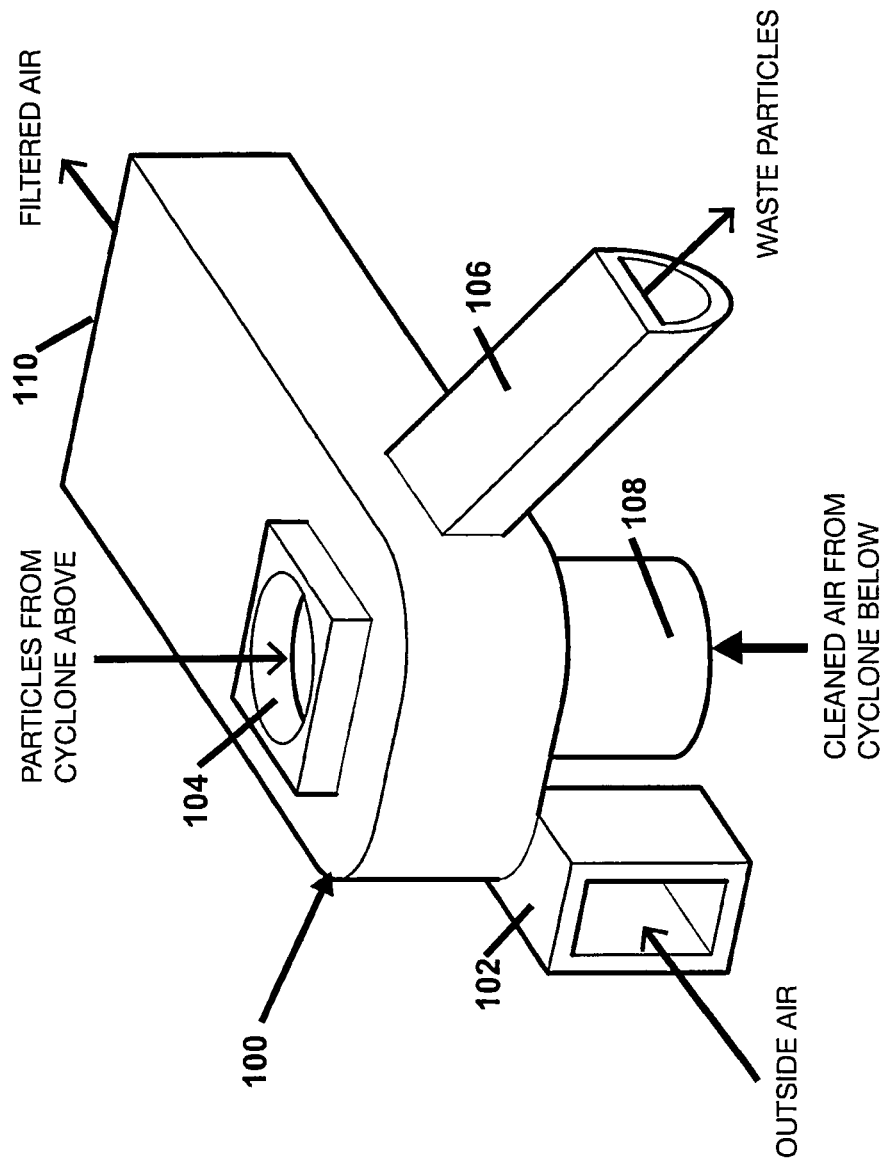
FIG. 1b is a perspective view of a cyclone separator coupler in accordance with an example embodiment of the present invention.

FIG. 1a is a perspective view of cyclone separator coupler 100 mounted between two cyclone chambers 101a, 101 b in accordance with an example embodiment of the present invention. FIG. 1b is a perspective view of a cyclone separator coupler 100. Cyclone separator coupler 100 has a dirty air inlet 102, a filtered air outlet 110, waste particle inlet 104, and waste particle chute 106. Baffle 108 serves to direct inlet air flow to induce centripetal motion in cyclone chamber 101b, while at the same time directing clean air from cyclone chamber 101b to the filtered air outlet 110. Although a single coupler 100 connecting two cyclone chambers 101 is shown in FIG. 1, it will be evident to those skilled in the art that numerous cyclone chambers can be interconnected by a plurality of couplers in a similar manner. The coupler has the distinct advantage in that it incorporates all the complex air flow (and waste particle flow) baffling, and can be manufactured as a stand alone part, separate from the cyclone chambers. It can be molded, cast, or machined from metals or plastics, depending on the required durability and cost of the intended application. The cyclone chambers can be provided as stand alone components (which attach to the couplers), or molded cavities within the masonry construction block. For details please refer to the example embodiments described below.

Figure 2:
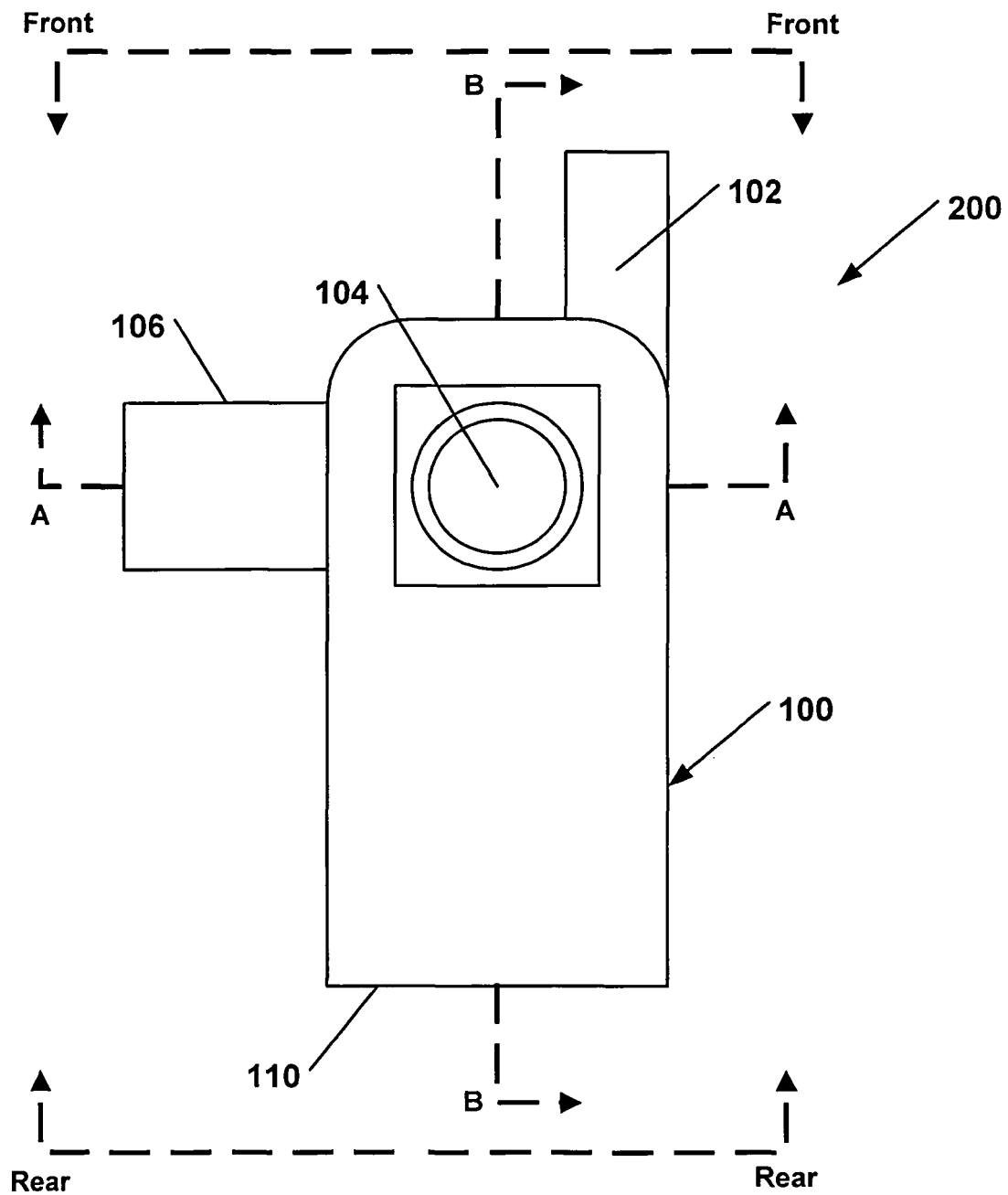
FIG. 2 is a top view of a cyclone separator coupler in accordance with an example embodiment of the present invention.
Figure 3:
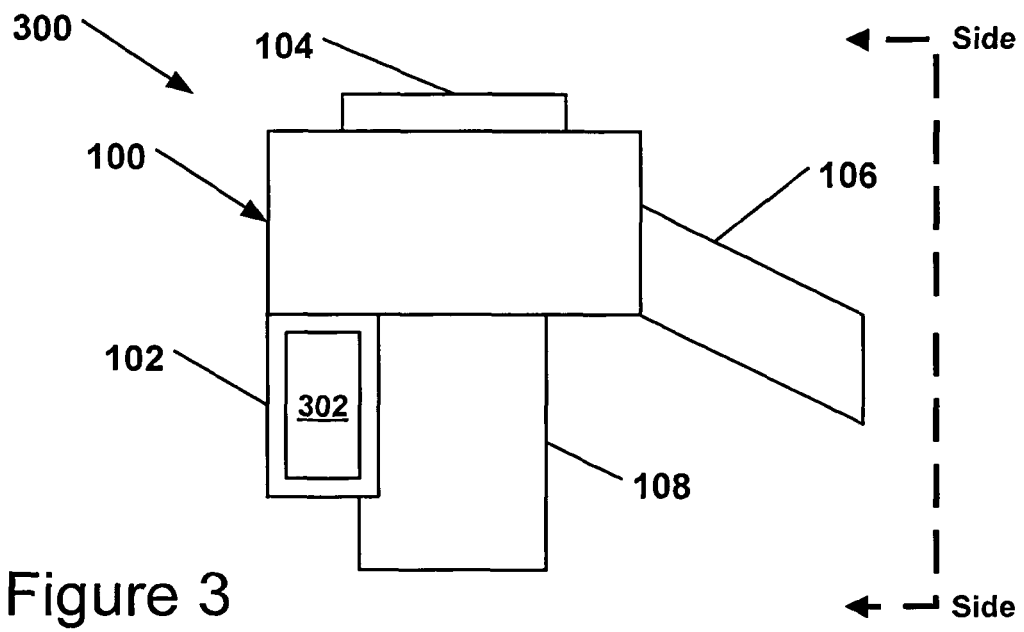
FIG. 3 is a front view of a cyclone separator coupler in accordance with an example embodiment of the present invention.
Figure 4:
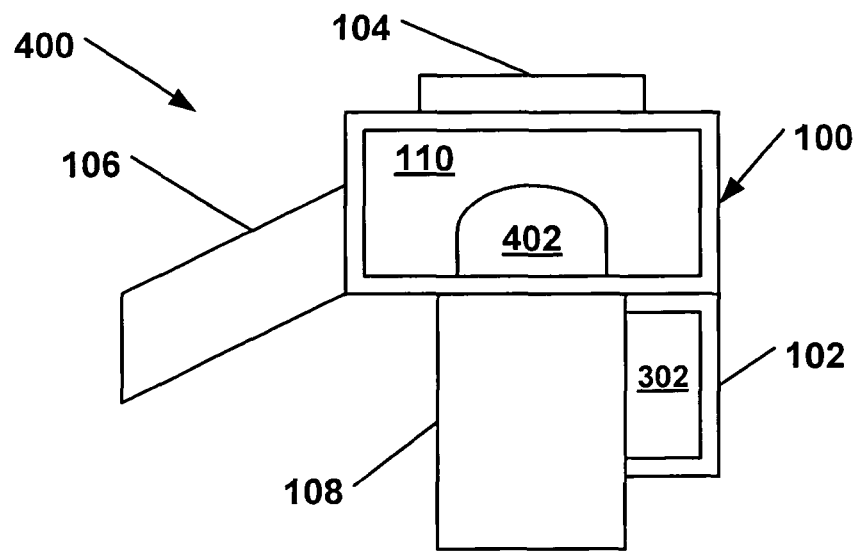
FIG. 4 is a rear view of a cyclone separator coupler in accordance with an example embodiment of the present invention.
Figure 5:
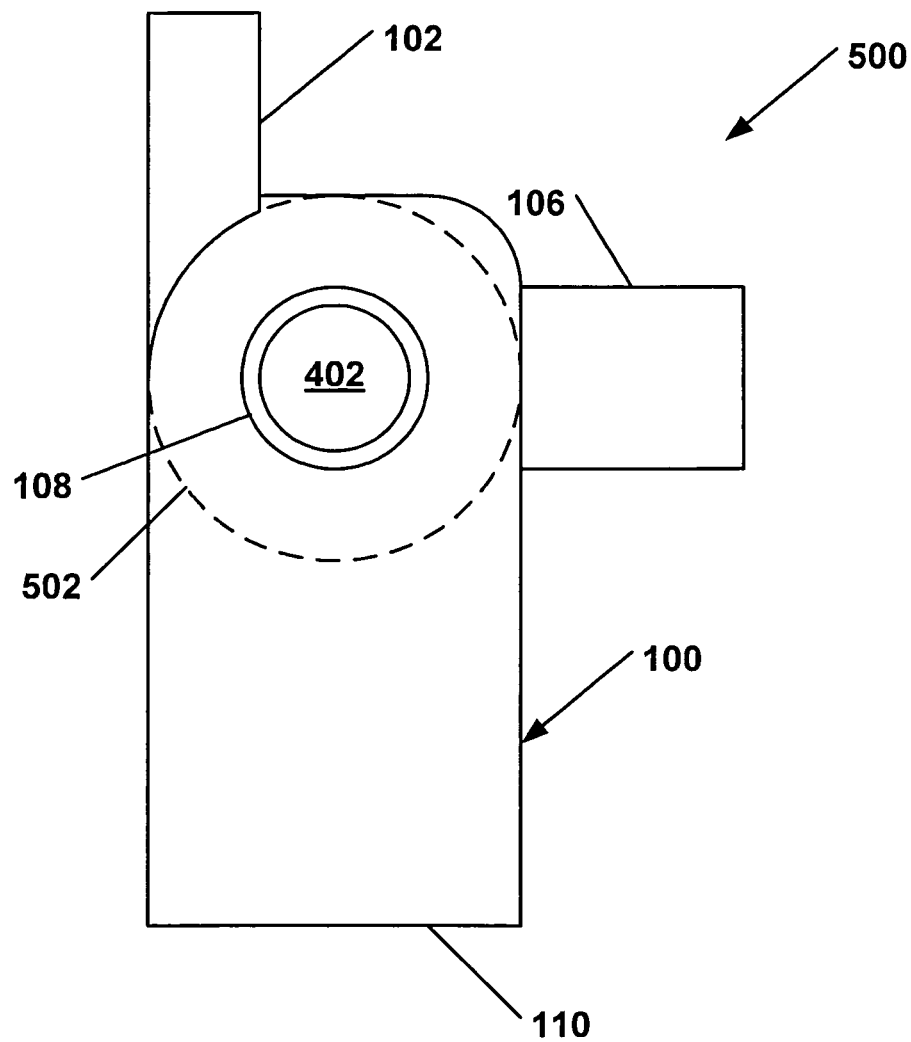
FIG. 5 is a bottom view of a cyclone separator coupler in accordance with an example embodiment of the present invention.
Figure 6:
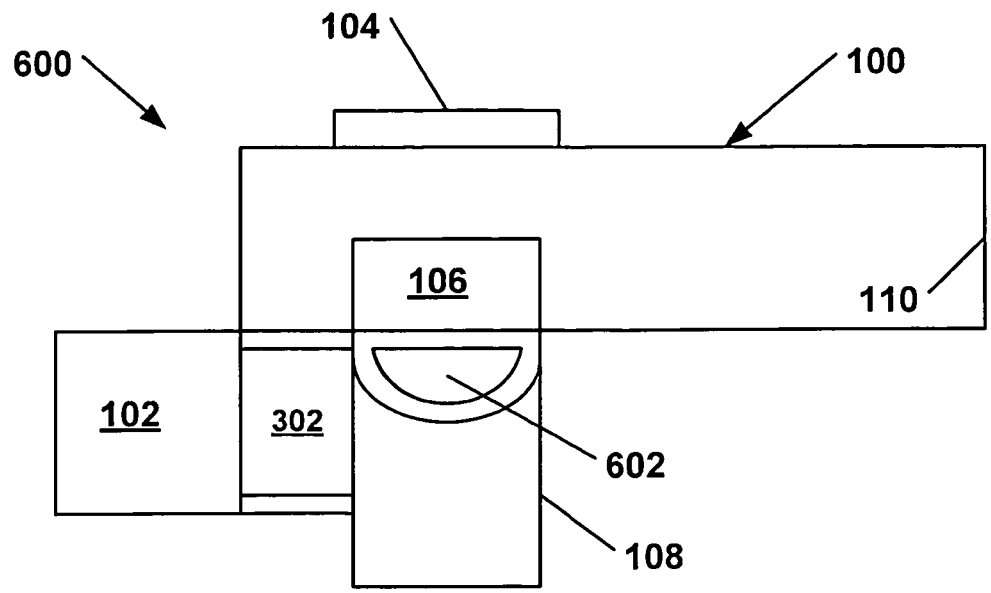
FIG. 6 is a side view of a cyclone separator coupler in accordance with an example embodiment of the present invention.

FIG. 2 is a top view 200 of a cyclone separator coupler 100 in accordance with an example embodiment of the present invention. FIG. 3 is a front view 300 of cyclone separator coupler 100. FIG. 4 is a rear view 400 of cyclone separator coupler 100. Inlet air passage 302 directs unfiltered air around baffle 108 into cyclone chamber (not shown). Filtered air from the base of the cyclone chamber (not shown) is directed through the center of baffle 108, through passage 402. FIG. 5 is a bottom view 500 of cyclone separator coupler 100. Broken line 502 represents the outer perimeter of a cyclone chamber mounted below coupler 100. FIG. 6 is a side view 600 of cyclone separator coupler 100. Passage 602 provides for the transport of waste particles through chute 106.

Figure 7:
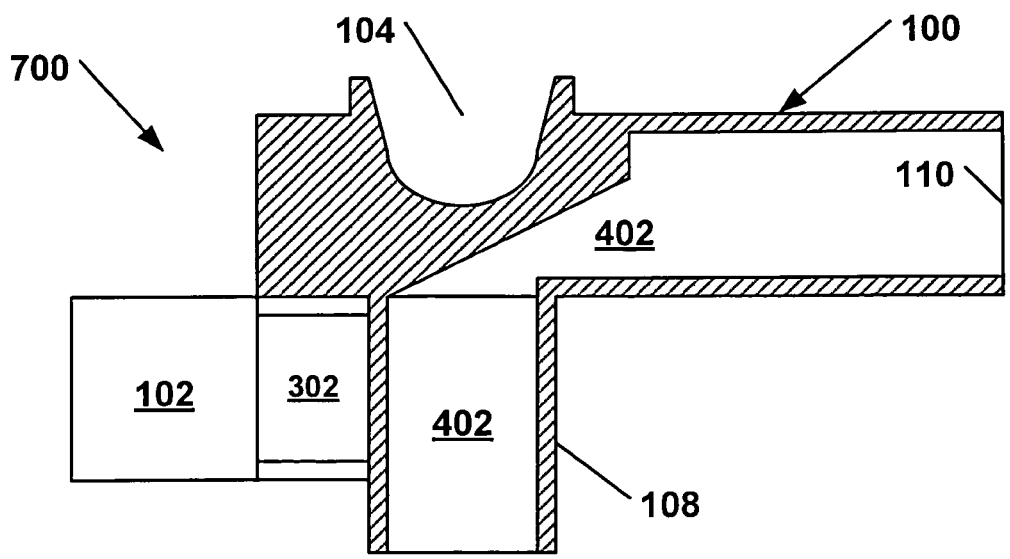
FIG. 7 is a partial cross section view through section B-B of FIG. 2, of a cyclone separator coupler in accordance with an example embodiment of the present invention.
Figure 8:
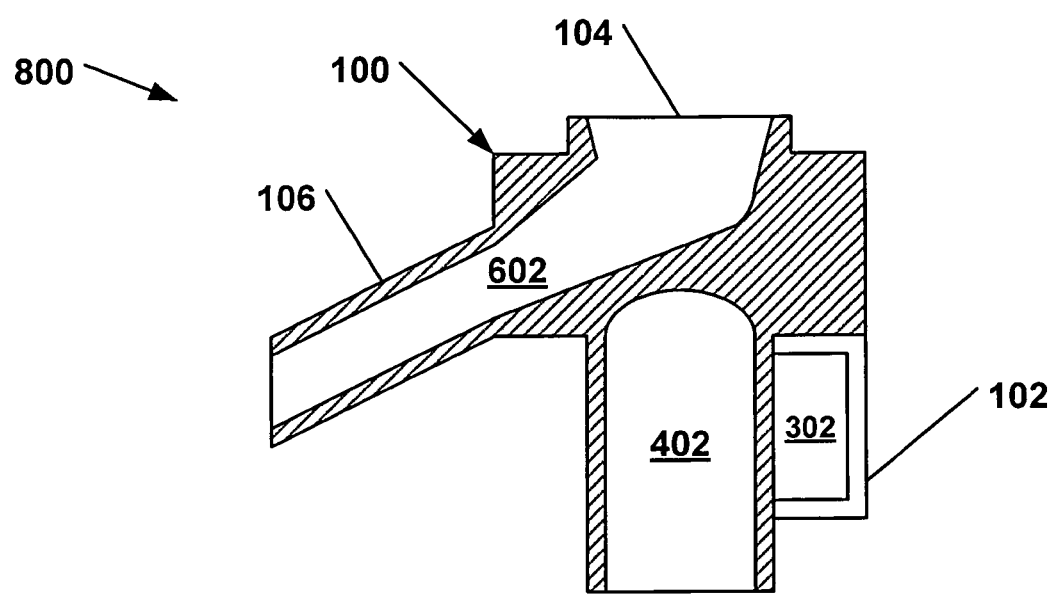
FIG. 8 is a partial cross section view through section A-A of FIG. 2, of a cyclone separator coupler in accordance with an example embodiment of the present invention.

FIG. 7 is a partial cross section view 700 through section B-B of FIG. 2, of a cyclone separator coupler 100 in accordance with an example embodiment of the present invention. FIG. 8 is a partial cross section view 800 through section A-A of FIG. 2, of a cyclone separator coupler 100. FIGS. 7 and 8 illustrate how the coupler 100 routes waste particles from the cyclone chamber above the coupler (not shown) via inlet 104 through passage 602 within waste chute 106, while simultaneously directing clean filtered air from the cyclone chamber mounted below coupler 100 (not shown) through passage 402 to clean air outlet 110.

Figure 9:
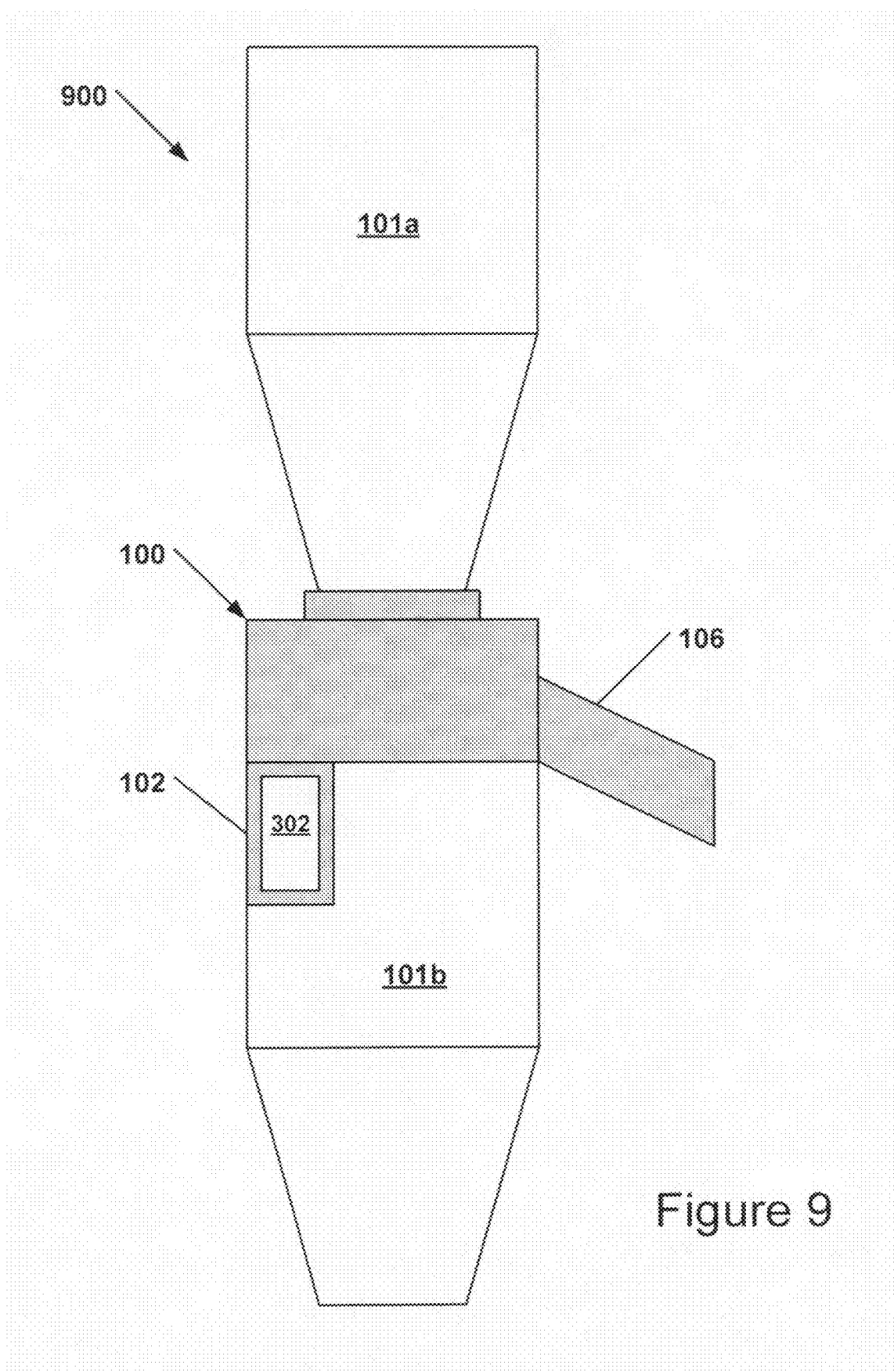
FIG. 9 is a front view of a cyclone separator coupler mounted between two cyclone separator chambers, in accordance with an example embodiment of the present invention.

FIG. 9 is a front view 900 of a cyclone separator coupler 100 mounted between two cyclone separator chambers 101a, 101b, in accordance with an example embodiment of the present invention.

Figure 10:
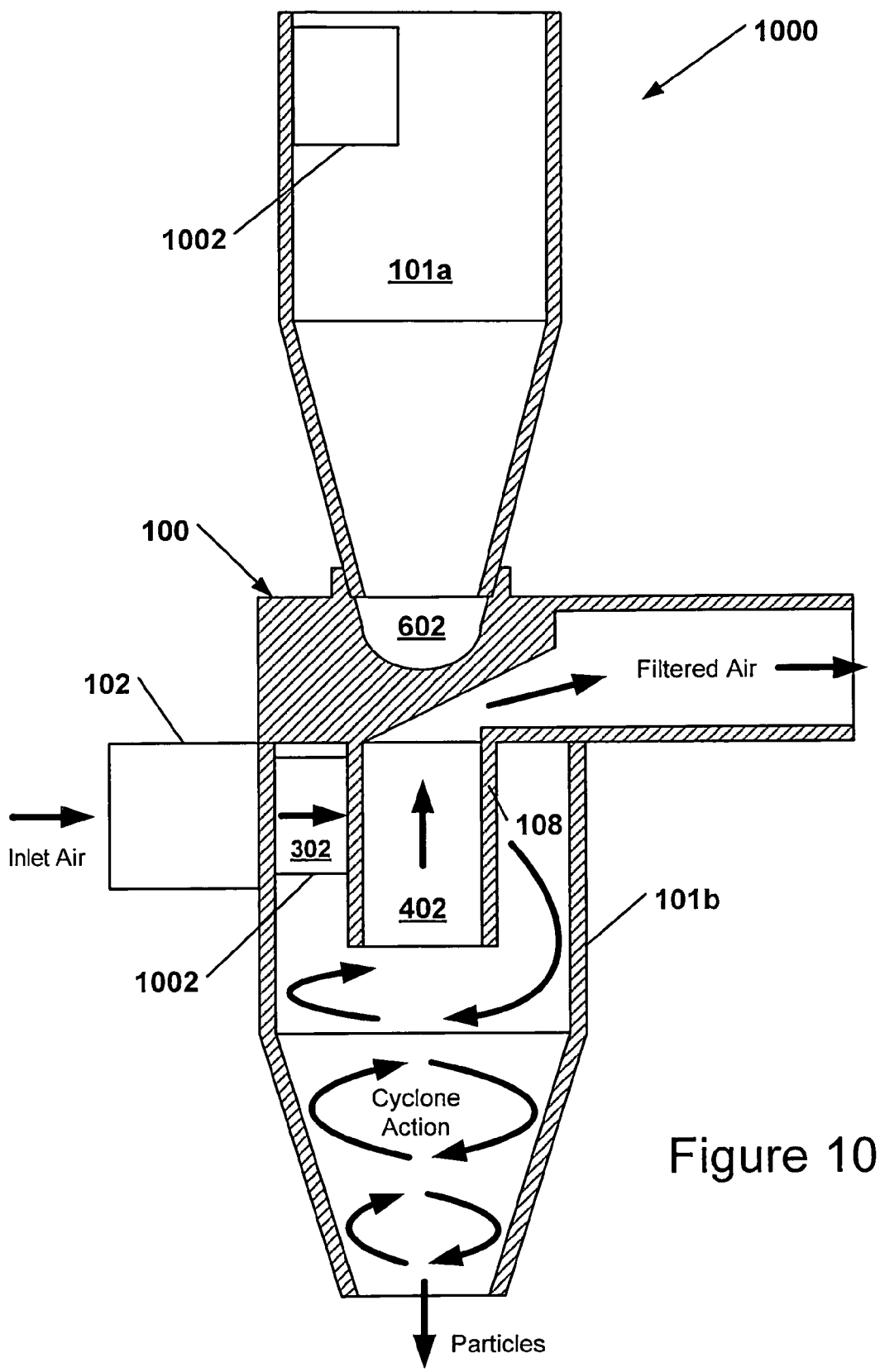
FIG. 10 is a partial cross section side view of a cyclone separator coupler mounted between two cyclone separator chambers showing air flow paths, in accordance with an example embodiment of the present invention.

FIG. 10 is a partial cross section side view 1000 of a cyclone separator coupler 100 mounted between two cyclone separator chambers 101a, 101b, showing air flow paths, in accordance with an example embodiment of the present invention. Cyclone separator chambers 101a and 101b have an aperture 1002 fashioned within the outer wall to accommodate the feed of unfiltered air from coupler 100 into the chambers. Unfiltered inlet air is directed via passage 302 around baffle 108, which induces a circular swirling motion within cyclone chamber 101b. As the particle laden air follows the wall contours of chamber 101b, it increases in velocity in the conical section where the diameter decreases. The centripetal forces separate the particles from the air, and the filtered air exits up through the swirling air at the outer walls of chamber 101b through passage 402 within baffle 108.

Figure 11:
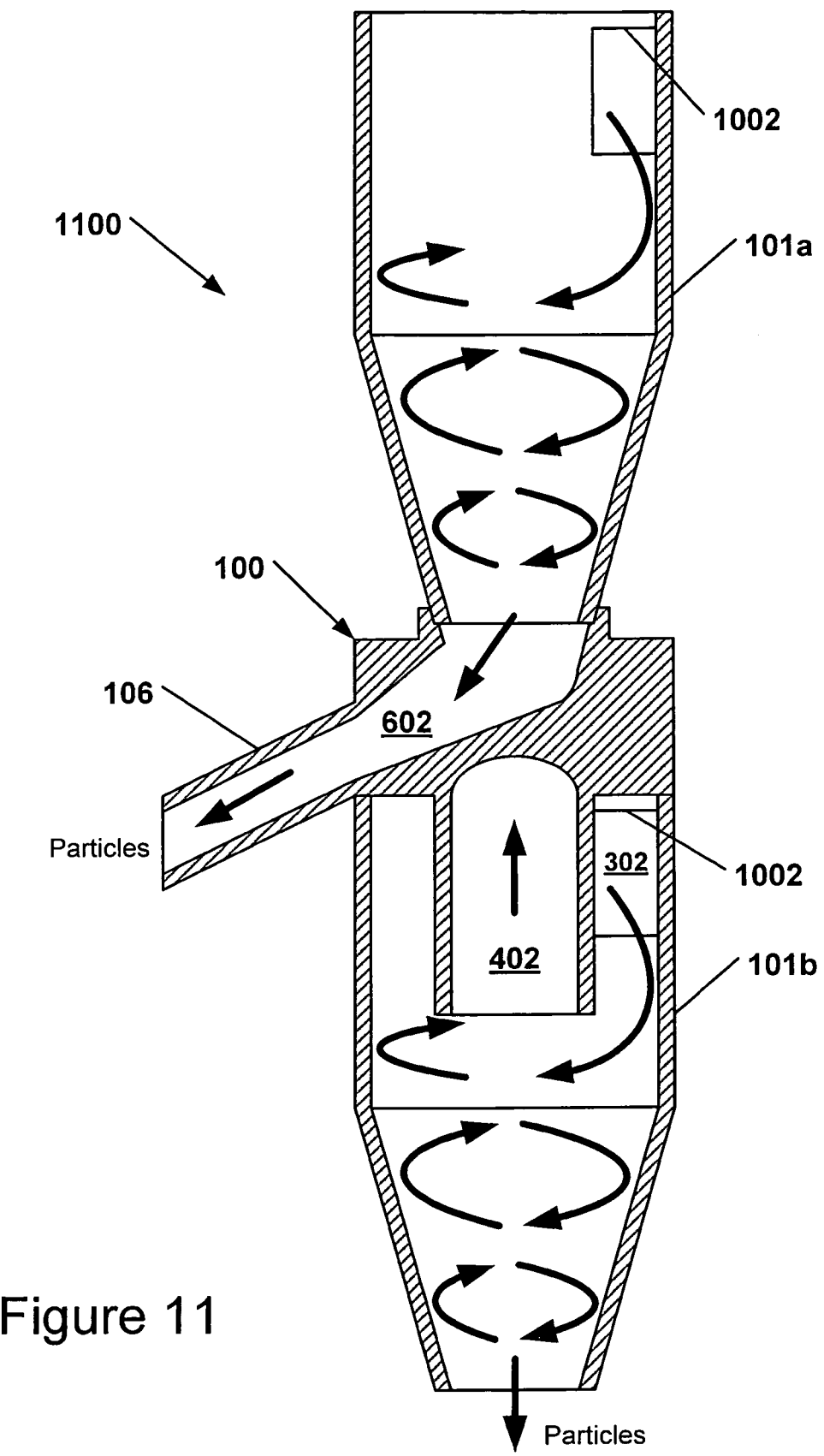
FIG. 11 is a partial cross section side view of a cyclone separator coupler mounted between two cyclone separator chambers showing particulate flow paths, in accordance with an example embodiment of the present invention.

FIG. 11 is a partial cross section side view 1100 of a cyclone separator coupler 100 mounted between two cyclone separator chambers 101a, 101b showing particulate flow paths, in accordance with an example embodiment of the present invention. Particles accumulating at the base of cyclone chamber 101a, for example, are directed via passage 602 to particle waste chute.

Figure 12:
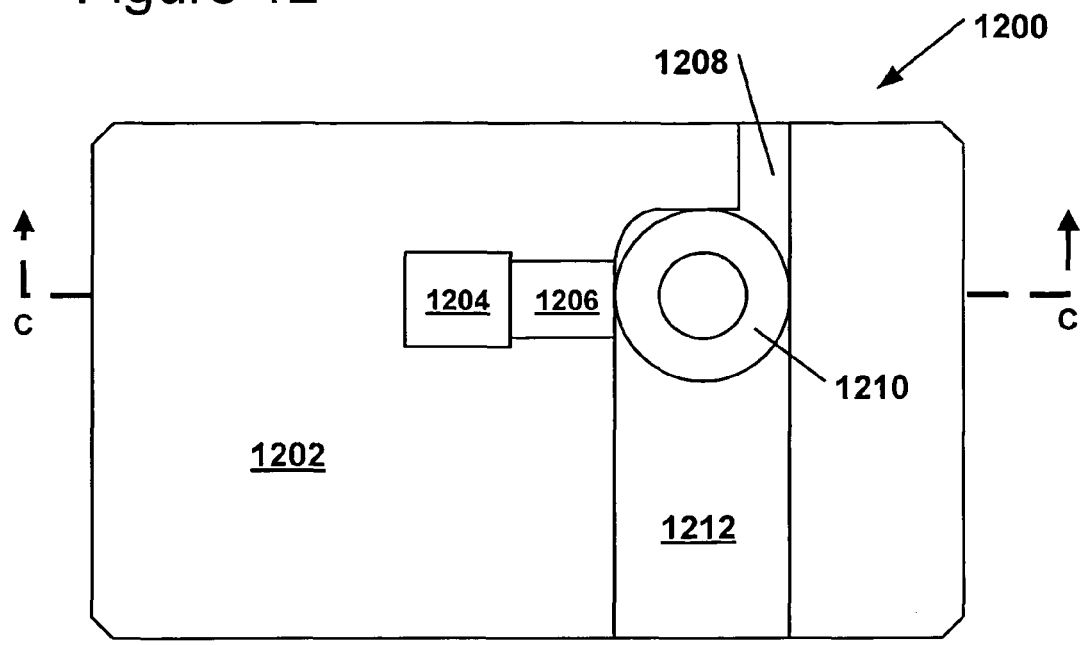
FIG. 12 is a top view of a construction block having molded cyclone separator cavities, in accordance with an example embodiment of the present invention.

FIG. 12 is a top view 1200 of a construction block 1202 having molded cyclone separator cavities 1204-1212, in accordance with an example embodiment of the present invention. In this example embodiment, the cyclone separator coupler 100 (not shown) is utilized with molded cavities in a solid masonry block. Since the complex flow passages of the cyclone separator are already incorporated within the coupler, the molded cavities only need reproduce the shape of the cyclone chamber cavity 1210, and the outer envelope of the coupler itself, cavity sections 1206, 1208, and 1212. Additionally, passages 1204 for waste particle disposal need be included. Cavities 1204-1212 are relatively easy to fabricate as they may be, for example, formed by solid mold inserts than can be removed from the top surface of the masonry block 1202 subsequent to curing. Subsequent to fabrication, a cyclone separator coupler 100 (not show) can be inserted into cavities 1206, 1208, and 1212 to form the completed cyclone separator. Blocks containing other cyclone separators can be stacked vertically, after aligning the waste particle passages 1204 and the waste particle outlet of the cyclone chamber with the particle inlet 104 of the coupler mounted below (see FIGS. 13,14).

Figure 13:
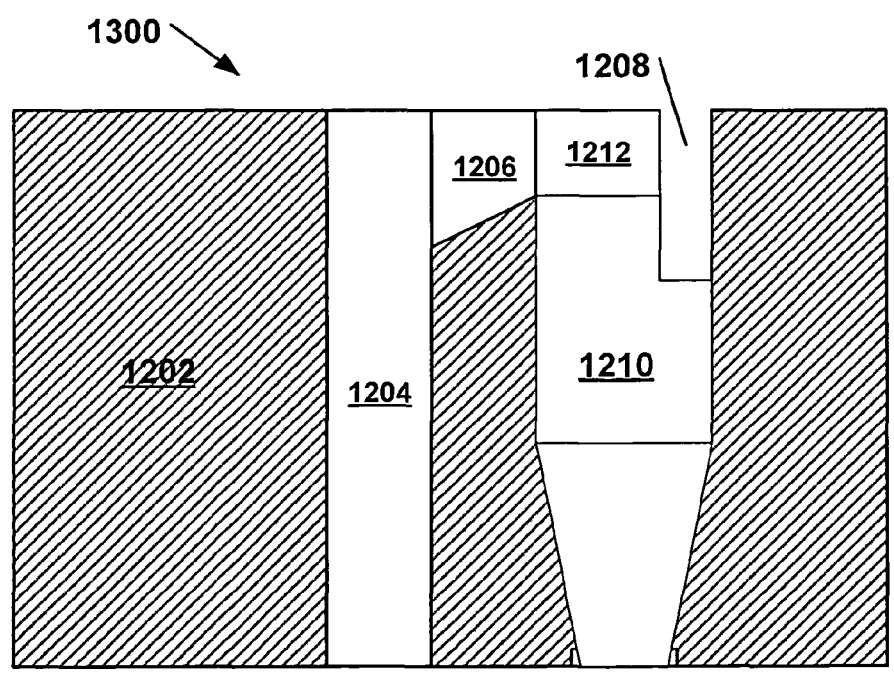
FIG. 13 is a cross section view through section C-C of FIG. 12, in accordance with an example embodiment of the present invention.
Figure 14:
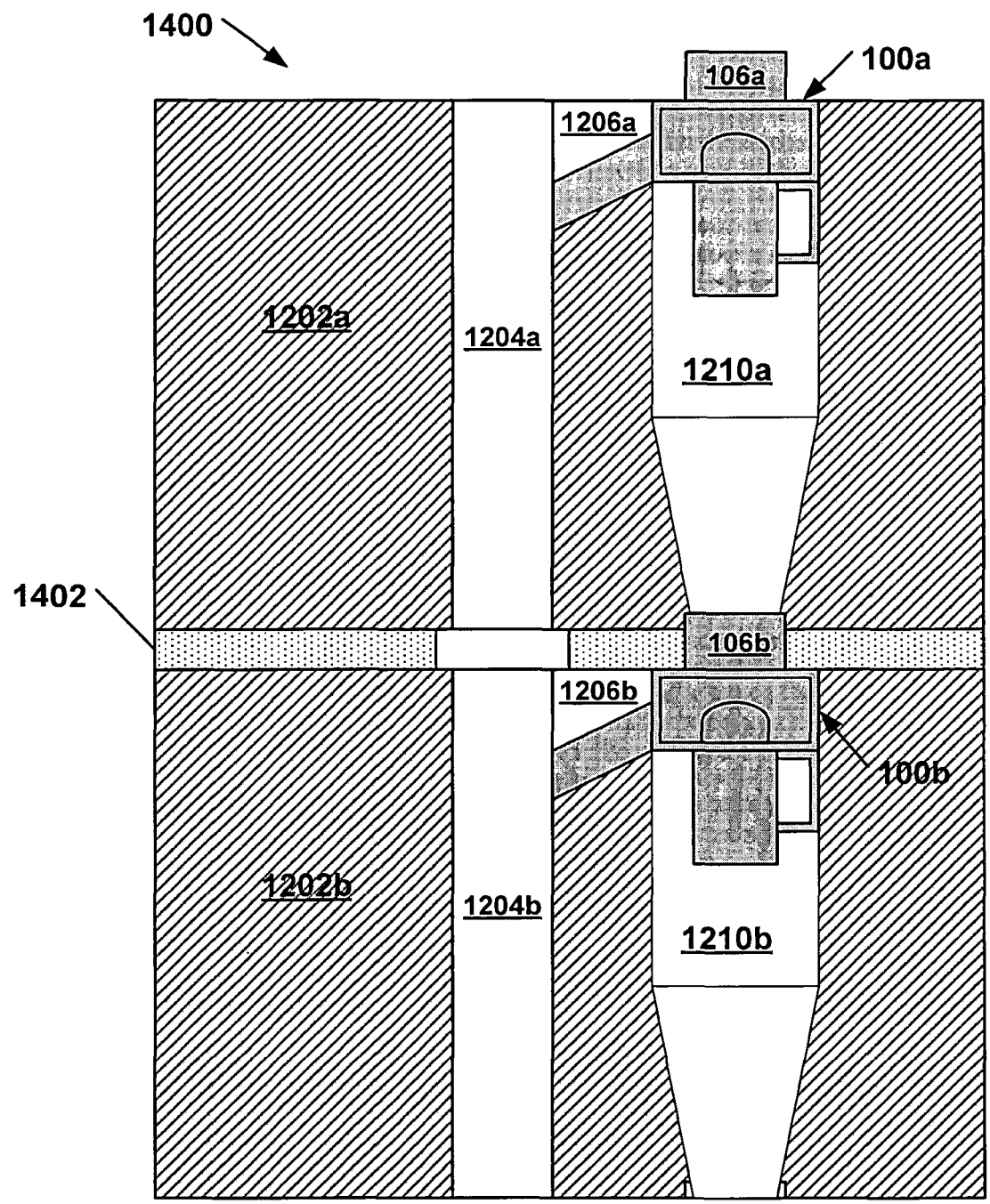
FIG. 14 is a cross section view of two stacked construction blocks of FIGS. 12,13, in accordance with an example embodiment of the present invention.

FIG. 13 is a cross section view 1300 through section C-C of FIG. 12, in accordance with an example embodiment of the present invention. FIG. 14 is a cross section view 1400 of two stacked construction blocks of FIGS. 12,13, in accordance with an example embodiment of the present invention. Mortar layer 1402 joins blocks 1202a and 1202b, and is interrupted in the location where particle waste disposal passages 1204a and 1204b join, so that waste particles can flow freely down through the construction blocks. Particle inlet 106a of coupler 100a, as an example, extends through mortar layer 1402 to index with cyclone chamber cavity 1210a.

While the forgoing example embodiments illustrate how costs can be reduced by combining a cyclone separator coupler with cast cavities in construction blocks, an even more cost effective solution can be obtained by utilizing standard "cinder" blocks, or construction blocks having hollow cells. The hollow cells are typically filled with grout and re-bar (reinforcing steel bar) as the wall or structure is being constructed. They save shipping costs to the construction site because they are hollow and are considerably lighter than solid blocks.

Figure 15:
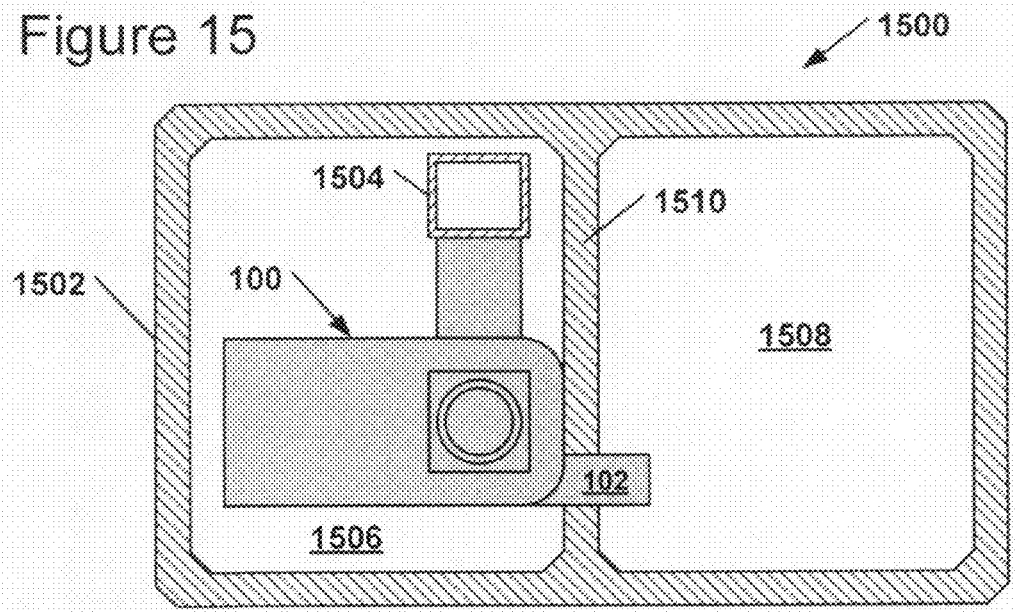
FIG. 15 is a top view of a hollow construction block having a cyclone separator coupler mounted within one hollow chamber, in accordance with an example embodiment of the present invention.

FIG. 15 is a top view 1500 of a hollow construction block 1502 having a cyclone separator coupler 100 mounted within one hollow chamber, in accordance with an example embodiment of the present invention. In this particular example embodiment, the unfiltered air inlet 102 is being fed by air within open chamber 1508. Coupler 100 is mounted adjacent to the separating internal wall 1510. This may be done, for example, by notching the wall 1510 or by placing a hooking surface underneath the unfiltered air intake duct 102 (not shown) such that the coupler 100 is "hung" on the upper wall surface. The filtered air is exhausted into the second open chamber 1506. Particles are deposited into plenum duct 1504, which is sealed to prevent contamination or the filtered air. Typically, plenum duct 1504 is terminated at a hopper at the base of the wall so that accumulated particulates can be removed. In this example embodiment, the hollow chambers 1506, 1508 are not filled with grout or rebar. For a single vertical column of blocks, or even an array of columns placed within a wall, this may not prove to be limiting, as all the other block members within the wall would be filled with grout and re-bar if required. This example embodiment has some significant advantages. The unfiltered air intake for all cyclone separators in a vertical array becomes the plenum formed by empty cinder block chambers 1508. Intake ducts can be fashioned to feed this plenum without any additional HVAC ducting, as the wall structure actually provides it. The requirement of air flowing down this feed duct to change direction to feed each individual cyclone separator provides another level of separation. Intake ducts (mounted at the top or bottom of the wall) can contain boost fans and insect screens to further enhance separation of the cyclones. The cyclones are completely installed within the wall, reducing the probability of intake fouling with insects or leaves and plant matter. Intake ducts can also be equipped with dampers or throttling devices to control the amount of air entering the home. In a similar manner, a single duct or network of ducts coupled to a plurality of chambers 1506 allows connection of filtered air to a central HVAC system, or direct feed into rooms within the home. In one example of this embodiment, a single cyclone separator (coupler plus chamber) is sized to fit within the height of a single cinder block row. However, as can be appreciated by those skilled in the art, this is not a rigid requirement. If longer cyclone chambers are required, then a single cyclone separator having a height of two cinder blocks (or ultimately n integer cinder blocks) may also be utilized. In yet another example embodiment, cyclone chambers may be connected to couplers via hollow tubing or ducting, to allow spacing of a small number of cyclone separators within tall wall structures.

Figure 16:
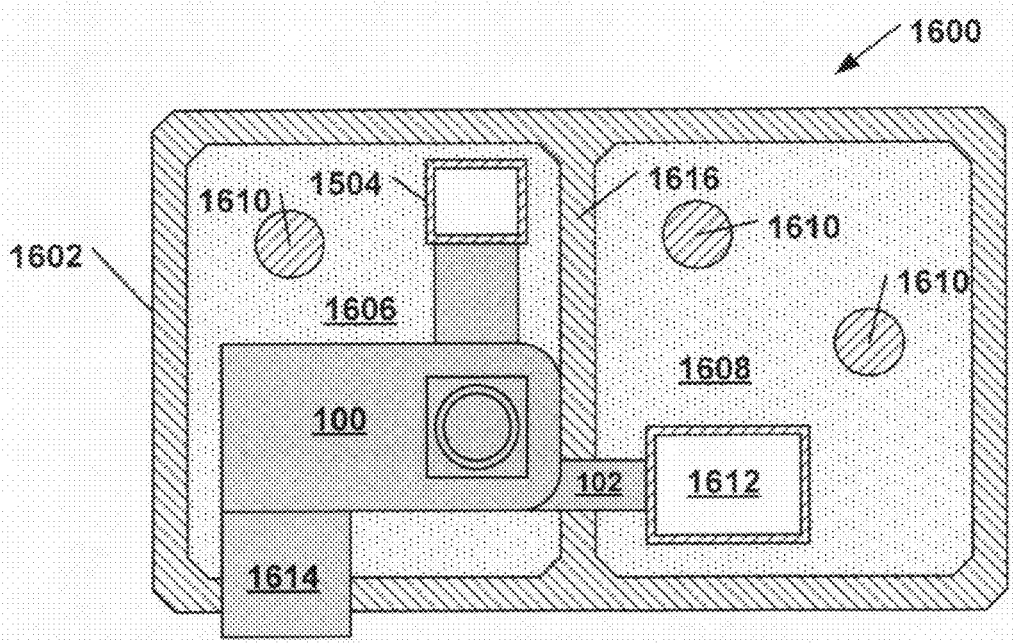
FIG. 16 is a top view of a hollow construction block having a cyclone separator coupler mounted within one hollow chamber, the construction block being filled with grout and re-bar, in accordance with an example embodiment of the present invention.

FIG. 16 is a top view 1600 of a hollow construction block 1602 having a cyclone separator coupler 100 mounted within one hollow chamber 1606, the construction block 1602 being filled with concrete and re-bar 1610, in accordance with an example embodiment of the present invention. For the case where unfilled hollow construction blocks are not suitable due to structural considerations, the example embodiment illustrated in FIG. 16 may be employed. Unfiltered air is supplied by duct 1612 which extends vertically through the wall. Duct 1612 may be connected to intake ducts having fans, screens, or throttling devices as previously described above. In this example embodiment, filtered air is directed through the construction block wall via extension duct 1614. In another example embodiment, filtered air can be directed to another internal vertical duct, similar to duct 1612 (not shown). After installation of the array of cyclone separators, concrete and re-bar can be filled within the open chambers 1606, 1608 to meet structural requirements.

Figure 17:
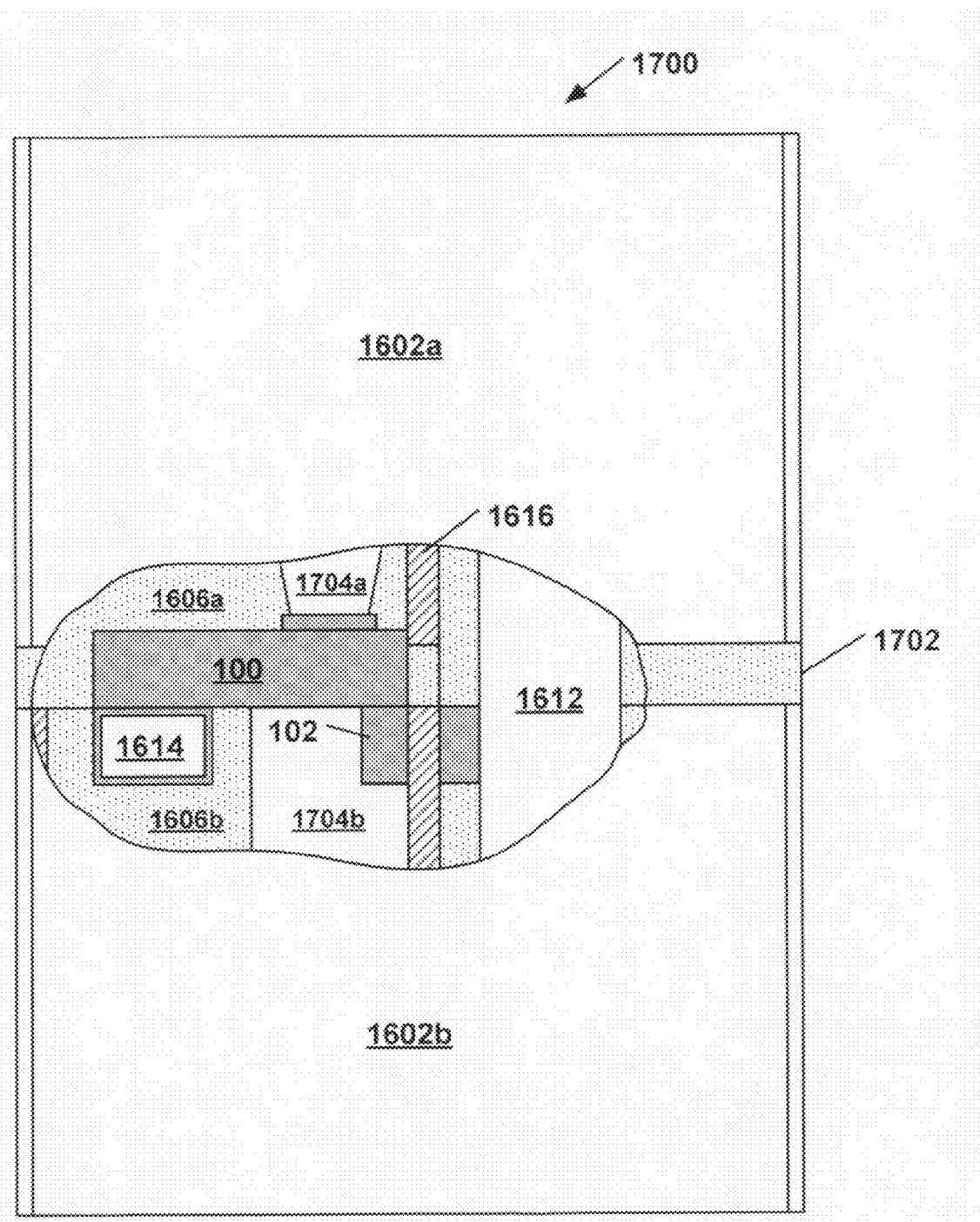
FIG. 17 is a partial cut-away side view of two stacked construction blocks of FIG. 16, in accordance with an example embodiment of the present invention.

FIG. 17 is a partial cut-away side view 1700 of two stacked construction blocks of FIG. 16, in accordance with an example embodiment of the present invention. Stacked construction blocks 1602*a*, 1602*b* are cemented together with mortar layer 1702 and filled with grout. Cyclone separator coupler 100 is connected to two cyclone separator chambers 1704*a* and 1704*b*, as shown in the cut away section.

Figure 18:
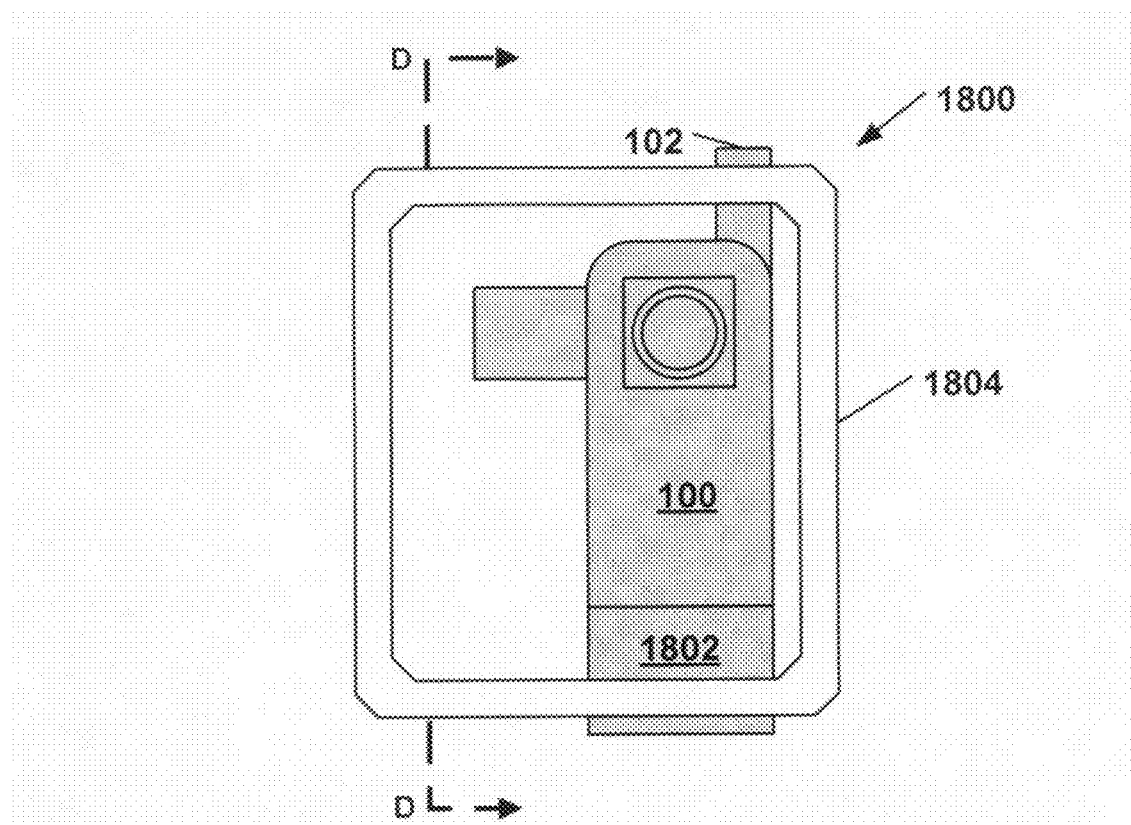
FIG. 18 is a top view of a cyclone separator coupler mounted within a gasket for mounting between stacked hollow construction blocks, in accordance with an example embodiment of the present invention.
Figure 19:
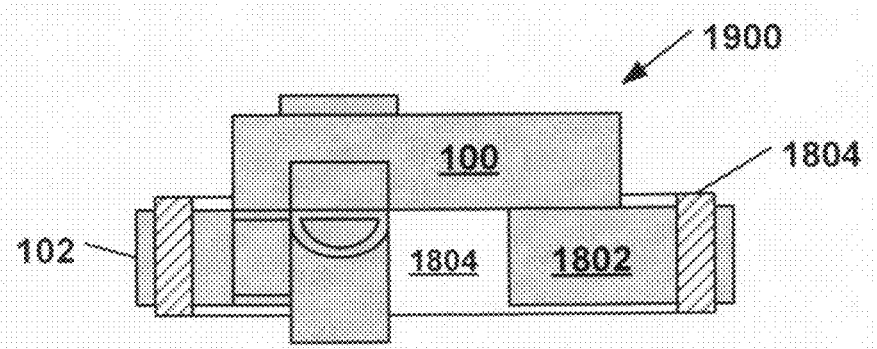
FIG. 19 is a partial cross section side view though section D-D of FIG. 18, in accordance with an example embodiment of the present invention.

FIG. 18 is a top view 1800 of a cyclone separator coupler 100 mounted within a gasket 1804 for mounting between stacked hollow construction blocks, in accordance with an example embodiment of the present invention. FIG. 19 is a partial cross section side view 1900 though section D-D of FIG. 18. This example embodiment reduces assembly costs even further by incorporating the cyclone separator coupler 100 within a gasket that is approximately the thickness of a typical mortar layer. The gasket seals the interior of the hollow construction blocks its mounted between from the elements, while serving as a mounting platform for coupler 100. In the example embodiment of FIGS. 18 and 19, the unfiltered air intake 102 extends through an exterior facing wall and the filtered air outlet 1802 extends through an interior wall. Cyclone separator chambers (not shown) would be attached to coupler 100 as the wall is being constructed, as well as a particle removal duct (not shown) such as 1504 in FIGS. 15 and 16. The gasket mounting has the distinct advantage of not requiring notching or modification of the construction blocks during assembly of the cyclone separator system.

Figure 20:
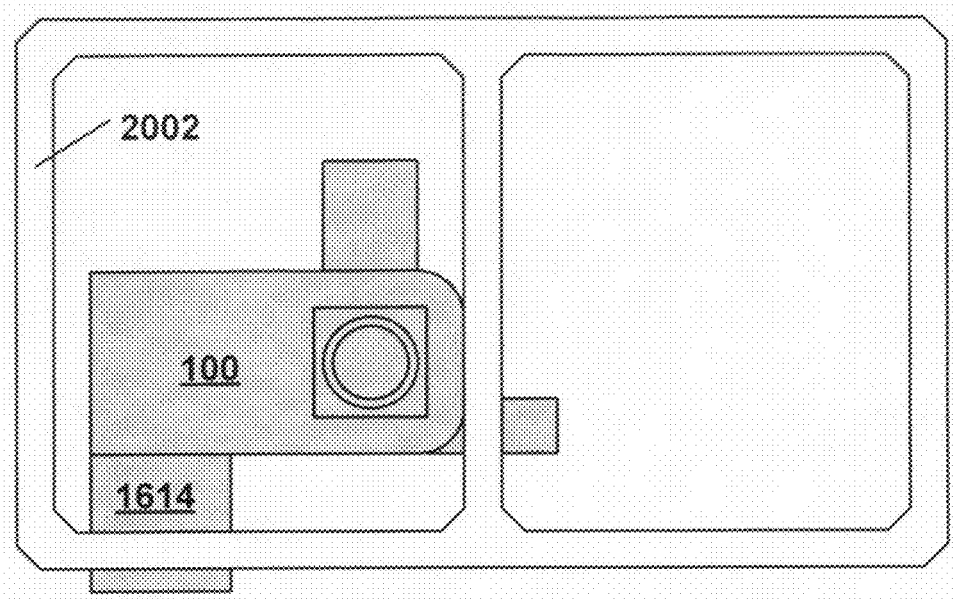
FIG. 20 is a top view of a cyclone separator coupler mounted within a gasket for mounting between stacked hollow construction blocks, in accordance with an example embodiment of the present invention.
Figure 21:
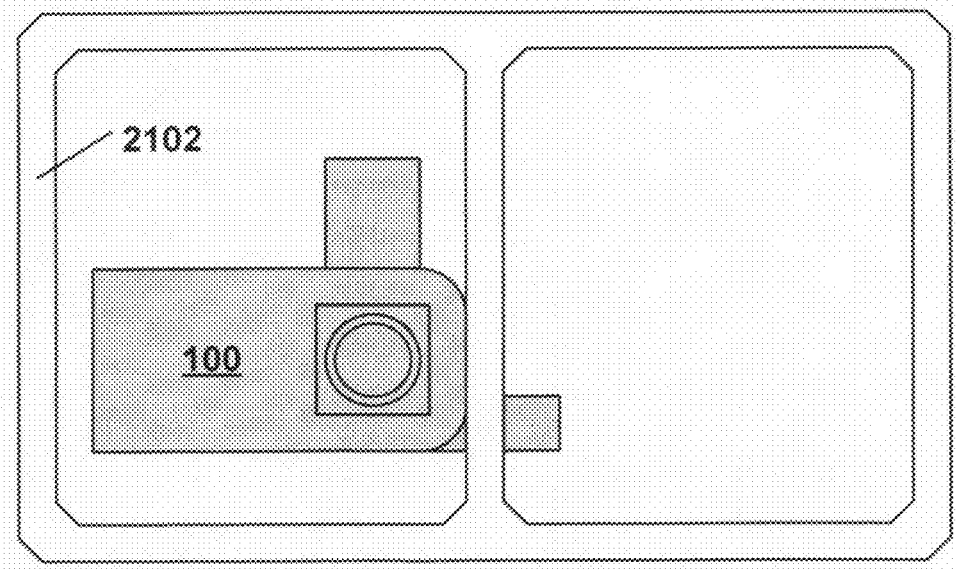
FIG. 21 is a top view of a cyclone separator coupler mounted within a gasket for mounting between stacked hollow construction blocks, in accordance with an example embodiment of the present invention.

FIGS. 20 and 21 are top views 2000, 2100 of cyclone separator couplers 100 mounted within a gasket for mounting between stacked hollow construction blocks, in accordance with example embodiments of the present invention. The example embodiment of FIG. 20 is similar to that depicted in FIG. 16, except that coupler 100 is mounted within a gasket. Ducts 1504 and 1612 are not shown, but would be added during assembly of gasket 2002 between rows of hollow construction blocks, if needed (along with the cyclone separator chambers). The example embodiment of FIG. 21 is similar to that depicted in FIG. 15, except that coupler 100 is mounted within gasket 2102.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A system for air filtration comprising:
a first cyclone separator chamber having a cylindrically shaped portion disposed above a conically shaped portion;
a second cyclone separator chamber having a cylindrically shaped portion disposed above a conically shaped portion, said second cyclone separator having a port fashioned within a wall of said cylindrically shaped portion; and
a cyclone separator coupler disposed between said conically shaped portion of said first cyclone separator chamber and said cylindrically shaped portion of said second cyclone separator chamber, said cyclone separator coupler having an input on a top surface for particulates leaving a bottom of said conically shaped portion of said first cyclone separator chamber, said cyclone separator coupler having an unfiltered air inlet directing air through said port fashioned within said wall of said second cyclone separator chamber, said cyclone separator coupler having a baffle to introduce rotary air motion within said second cyclone separator chamber, said cyclone separator coupler having a chute on a side of said cyclone separator coupler such that said particulates leaving said bottom of said conically shaped portion of said first cyclone separator chamber are directed through said chute on said side of said cyclone separator coupler, wherein unfiltered air entering said cyclone separator coupler is directed around an outside surface of said baffle, whereas filtered air leaving the cylindrically shaped portion of said second cyclone separator chamber is directed through a center of said baffle to a clean air outlet of said cyclone separator coupler.

2. The system as recited in claim 1, further comprising:
said first cyclone separator chamber fabricated as an empty cavity within a first solid construction block;
said second cyclone separator chamber fabricated as a first empty cavity within a second solid construction block;
wherein said cyclone separator coupler is disposed within a second empty cavity located above said first empty cavity of said second solid construction block, said first solid construction block disposed above said second solid construction block.

3. The system as recited in claim 2, wherein particulates leaving said chute on the side of said cyclone separator coupler are directed to a disposal channel fabricated within said second solid construction block.

4. The system as recited in claim 2, wherein said unfiltered air inlet of said cyclone separator coupler is located on a first surface of said second solid construction block and said clean air outlet of said cyclone separator coupler is located on a second surface of said second solid construction block, said first surface opposing said second surface.

5. The system as recited in claim 4, wherein said first and said second solid construction blocks are part of an exterior wall of a dwelling, said first surface of said second solid construction block being part of an exterior surface of said exterior wall, and said second surface of said second solid construction block being part of an interior surface of said exterior wall.

6. The system as recited in claim 1, wherein said cyclone separator coupler is disposed within a first chamber of a hollow construction block, said hollow construction block having said first hollow chamber, a second hollow chamber, and a dividing wall between said first and said second hollow chambers.

7. The system as recited in claim 6, wherein said unfiltered air inlet of said cyclone separator coupler is fed from said second hollow chamber of said hollow construction block.

8. The system as recited in claim 7, wherein said hollow construction block is a portion of a wall of a dwelling, said second hollow chamber forming part of a first open duct formed by hollow construction blocks situated above and below said hollow construction block.

9. The system as recited in claim 8, wherein an intake vent for air feeding said dwelling is coupled to said first open duct.

10. The system as recited in claim 6, wherein said unfiltered air inlet of said cyclone separator coupler is fed from a first duct within said second hollow chamber of said hollow construction block.

11. The system as recited in claim 6, wherein said clean air outlet is directed into said first hollow chamber of said hollow construction block.

12. The system as recited in claim 11, wherein said hollow construction block is a portion of a wall of a dwelling, said first hollow chamber forming part of a second open duct formed by hollow construction blocks situated above and below said hollow construction block.

13. The system as recited in claim 12, wherein an exhaust vent for clean air into said dwelling is coupled to said second open duct.

14. The system as recited in claim 6, wherein said clean air outlet is directed into a second duct within said first hollow chamber of said hollow construction block.

15. The system as recited in claim 6, wherein particulates leaving said chute on the side of said cyclone separator coupler are directed to a third duct within said first hollow chamber of said hollow construction block.

16. The system as recited in claim 1, wherein said cyclone separator coupler is an integral part of a gasket structure, said gasket structure suitable for use with a hollow construction block, said gasket structure placing said cyclone separator coupler within a hollow chamber of said hollow construction block.

17. The system as recited in claim 16, wherein said unfiltered air inlet and said clean air outlet of said cyclone separator coupler fit within the thickness of said gasket structure.

* * * * *